(12) United States Patent
Benisty (10) Patent No.: US 11,397,699 B2
(45) Date of Patent: Jul. 26, 2022

(54) INTERRUPT COALESCING PROTECTION LOGIC

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/216,468

(22) Filed: Mar. 29, 2021

(65) Prior Publication Data

US 2022/0156208 A1 May 19, 2022

Related U.S. Application Data (60) Provisional application No. 63/115,438, filed on Nov. 18, 2020.

(51) Int. Cl.
*G06F 13/24* (2006.01)
*G06F 21/85* (2013.01)

(52) U.S. Cl.
CPC .............. *G06F 13/24* (2013.01); *G06F 21/85* (2013.01)

(58) Field of Classification Search
CPC .......... G06F 13/00; G06F 13/24; G06F 21/85
See application file for complete search history.

(56) References Cited

U.S. PATENT DOCUMENTS

| | | | |
|---|---|---|---|
| 6,065,089 A * | 5/2000 | Hickerson | G06F 9/4825 710/48 |
| 11,249,926 B1 * | 2/2022 | Han | G06F 9/3857 |
| 2015/0212564 A1 * | 7/2015 | Min | G06F 1/32 713/320 |
| 2018/0275872 A1 | 9/2018 | Benisty et al. | |
| 2020/0117623 A1 * | 4/2020 | Han | G06F 3/0673 |
| 2022/0066954 A1 * | 3/2022 | Han | G06F 13/1668 |

* cited by examiner

*Primary Examiner* — Henry Tsai
*Assistant Examiner* — Kim T Huynh
(74) *Attorney, Agent, or Firm* — Patterson + Sheridan, LLP; Steven H. Versteeg (57) ABSTRACT

A data storage device, such as a solid state drives (SSD), includes command completion interrupt coalescing. A controller of the data storage device includes one or more completion queues, each including interrupt coalescing protection logic. The interrupt coalescing protection logic detects that a head pointer or a tail pointer in a completion queue has not changed for a predetermined period of time. When the head and tail pointers have not changed for the predetermined period of time, the controller posts an interrupt to a host device.

20 Claims, 6 Drawing Sheets

INTERRUPT COALESCING PROTECTION LOGIC

CROSS-REFERENCE TO RELATED APPLICATIONS

This application claims benefit of U.S. provisional patent application Ser. No. 63/115,438, filed Nov. 18, 2020, which is herein incorporated by reference.

BACKGROUND

Embodiments of the present disclosure generally relate to data storage devices, such as solid state drives (SSDs), and command completion interrupt coalescing.

A common bottleneck for high-speed data transfers is the high rate of interrupts that the receiving system may be required to process. The interrupts consume signaling resources on the bus(es) of the system and may introduce significant CPU overhead as the system transitions between "productive" work and interrupt handling. The transitions between "productive" work and interrupt handling may occur many thousands of times per second (i.e., context switch). In order to alleviate the transition load, the NVMe standard supports interrupt coalescence via the PCIe bus. When multiple command completions are received in a short timeframe, the controller of the data storage device may coalesce the messages and interrupt the system only once.

Interrupt coalescence works by holding any completion queue entries in a completion queue, such that an interrupt is not sent to the receiving system immediately after completing a command. The completion queue entries in the completion queue may be aggregated so that a single interrupt is sent to the system for an aggregated number of completion queue entries. However, there is a trade-off between latency and load reduction when defining an adaptive and dynamic interrupt coalescing algorithm. Furthermore, there may be a risk associated with the adaptive and dynamic interrupt coalescing algorithm, such as interrupt avoidance. Interrupt avoidance occurs when an associated interrupt for a completion queue entry is not sent to the receiving system due to an inaccuracy in the implementation of the adaptive and dynamic interrupt coalescing algorithm.

Thus, there is a need in the art for interrupt coalescing protection logic.

SUMMARY OF THE DISCLOSURE

The present disclosure generally relates to data storage devices, such as solid state drives (SSDs), and command completion interrupt coalescing. A controller of the data storage device includes one or more completion queues, each including interrupt coalescing protection logic. The interrupt coalescing protection logic detects that a head pointer or a tail pointer in a completion queue has not changed for a predetermined period of time. When the head and tail pointers have not changed for the predetermined period of time, the controller posts an interrupt to a host device.

In one embodiment, a data storage device includes one or more non-volatile memory devices and a controller coupled to the memory devices. The controller includes interrupt coalescing protection logic configured to detect that a head pointer or a tail pointer in a completion queue has not changed for a predetermined period of time and post an interrupt to a host device.

In another embodiment, a data storage device includes one or more non-volatile memory devices and a controller coupled to the memory devices. The controller includes interrupt coalescing protection logic configured to move between a state where a timer is active, the timer is reset, and the timer is inactive, and post an interrupt to a host device after the timer is active and a timeout has occurred.

In another embodiment, a data storage device includes one or more non-volatile memory devices, means to perform adaptive and dynamic interrupt coalescing, and means to post an interrupt to a host device based upon a timer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and command completion interrupt coalescing. A controller of the data storage device includes one or more completion queues, each including interrupt coalescing protection logic. The interrupt coalescing protection logic detects that a head pointer or a tail pointer in a completion queue has not changed for a predetermined period of time. When the head and tail pointers have not changed for the predetermined period of time, the controller posts an interrupt to a host device.

Figure 1:
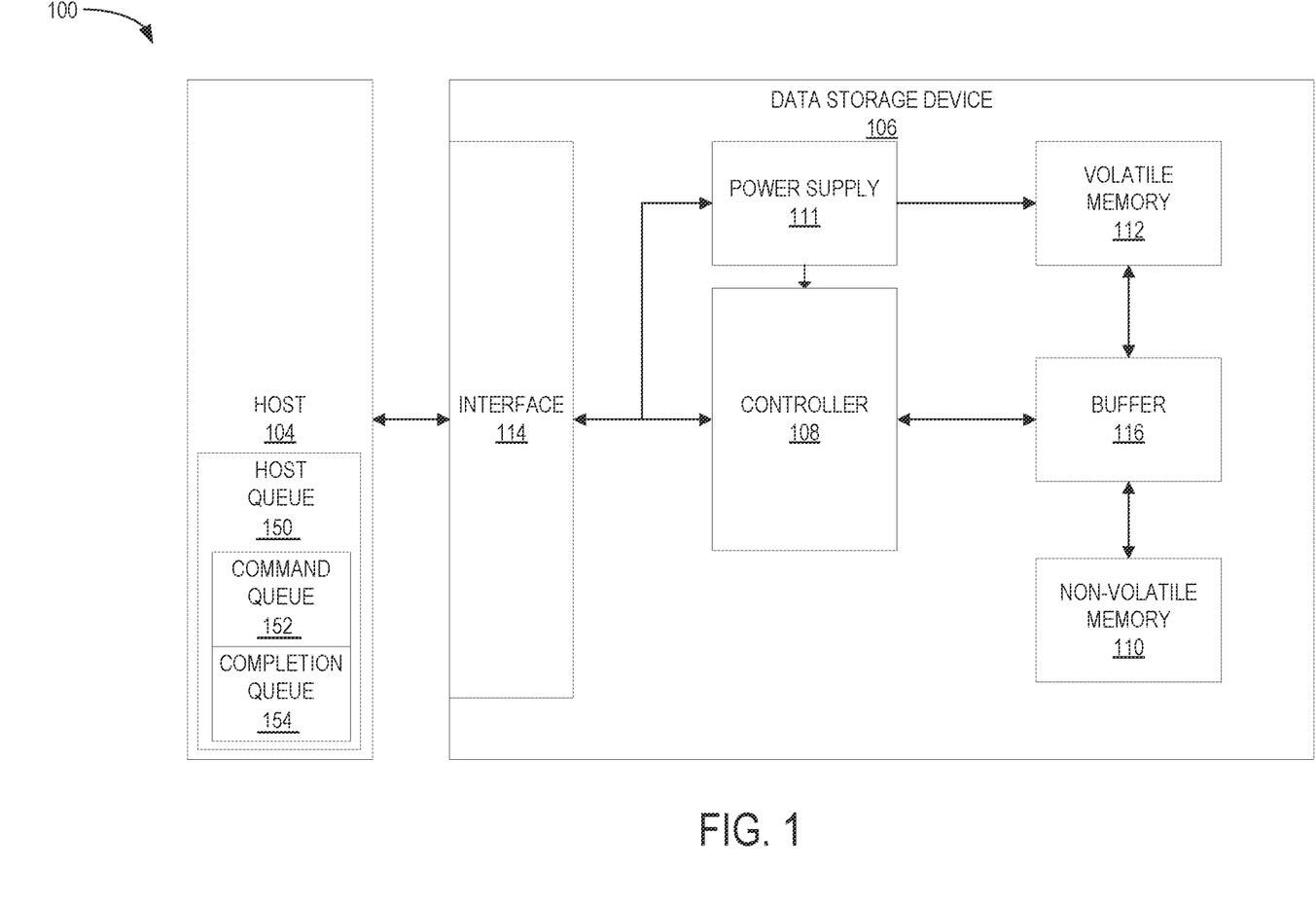
FIG. 1 is a schematic block diagram illustrating a storage system in which a data storage device may function as a storage device for a host device, according to certain embodiments.

FIG. 1 is a schematic block diagram illustrating a storage system 100 in which a data storage device 106 may function as a storage device for a host device 104, according to certain embodiments. For instance, the host device 104 may utilize a non-volatile memory (NVM) 110 included in data storage device 106 to store and retrieve data. The host device 104 may include a host DRAM. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

Furthermore, the host device 104 includes a host queue 150. The host queue 150 includes a command queue 152 and a completion queue 154. The command queue 152 stores generated commands for the data storage device 104 to fetch. The completion queue 154 stores completion queue entries associated with data storage device 104 completed commands. In some embodiments, the host queue 150 includes one or more host queues. Furthermore, the host queue 150 may include one or more command queues and/or one or more completion queues.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
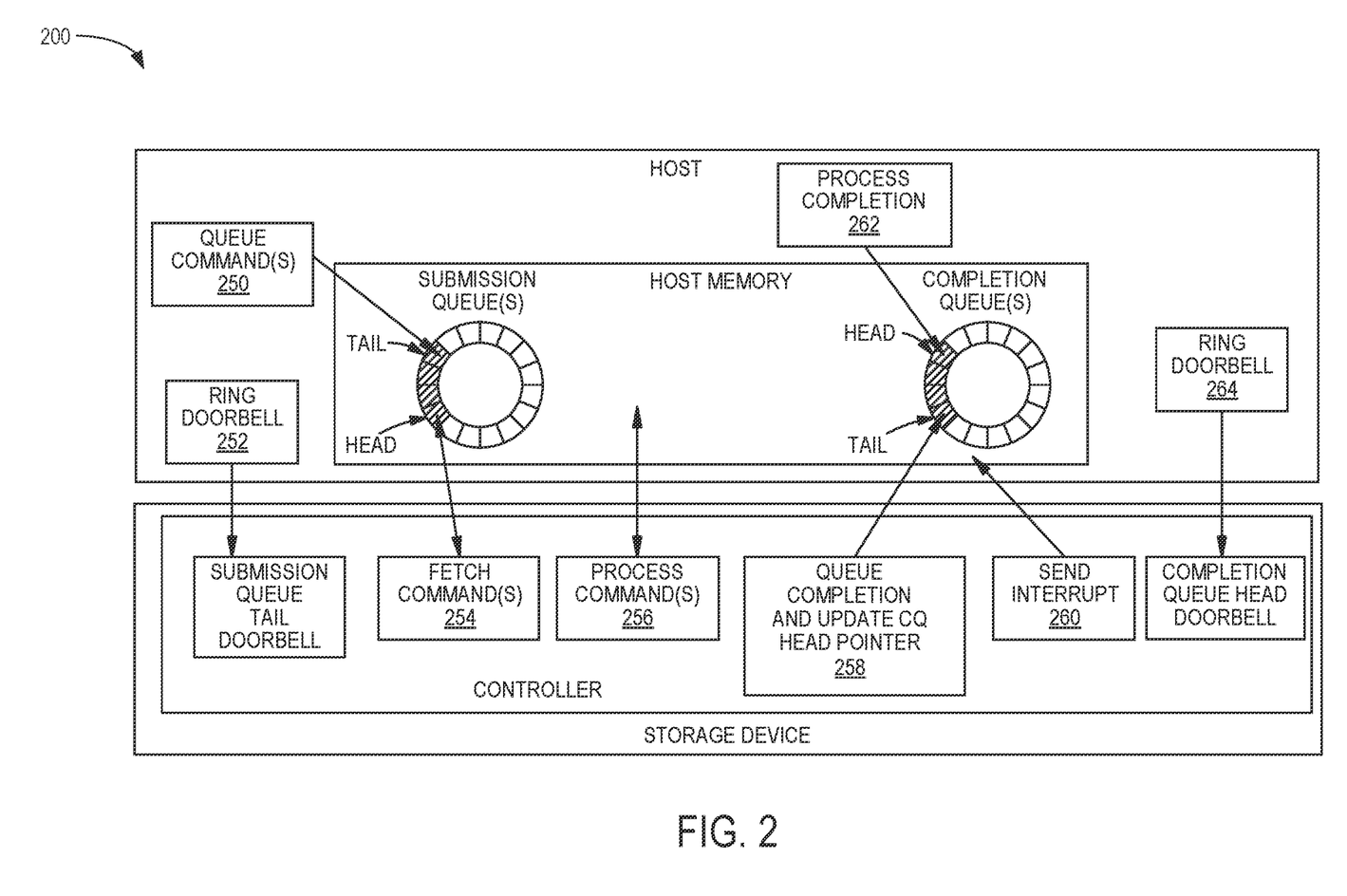
FIG. 2 is a block diagram illustrating a method of operating a storage device to execute a read or write command, according to certain embodiments.

FIG. 2 is a block diagram illustrating a method 200 of operating a storage device to execute a read or write command, according to certain embodiments. Method 200 may be used with the storage system 100 having a host device 104 including a host queue 150, where the host queue 150 includes a command queue 152 and a completion queue 154, and a storage device 106 including a controller 108.

Method 200 begins at operation 250, where the host device writes a command into a submission queue as an entry. The host device may write one or more commands into the submission queue at operation 250. The commands may be read commands or write commands. The host device may comprise one or more submission queues.

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
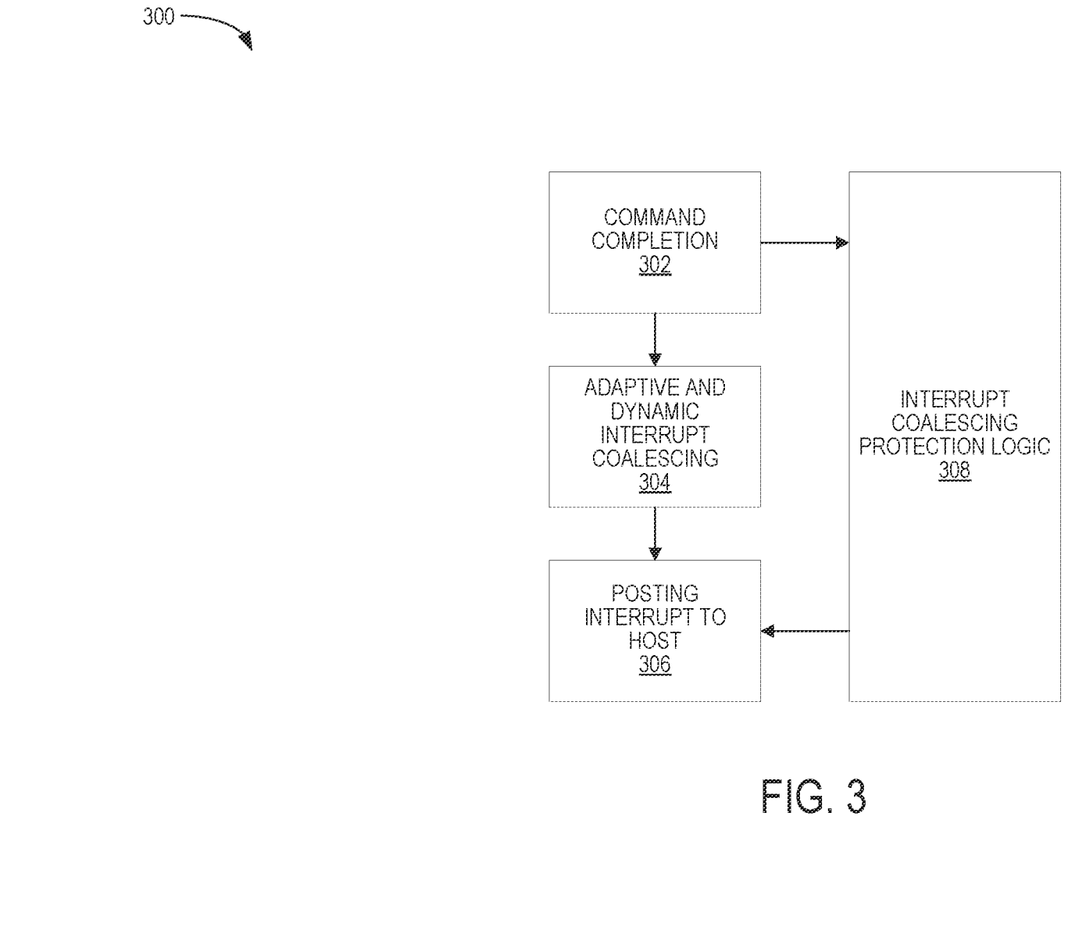
FIG. 3 is a schematic block diagram illustrating a concept of interrupt coalescing protection logic, according to certain embodiments.

FIG. 3 is a schematic block diagram illustrating a concept of interrupt coalescing protection logic, according to certain embodiments. Aspects of FIG. 1 may be utilized to aid in the description of FIG. 3. The usage of FIG. 1 is not intended to be limiting, but to provide an example of a possible embodiment. A race condition occurs when two or more processes access and manipulate the same data concurrently. The outcome of the execution may be dependent on the particular order in which the access by each process place. In some examples, race conditions may be avoided by implementing process synchronization and/or coordination techniques. In the NVMe standard, false interrupts are supported in order to avoid race conditions. Using FIG. 1 as an example, a false interrupt means that the host 104, receives an interrupt, goes to the relevant completion queue 154, and detects that the completion queue 154 is empty.

At block 302, the data storage device 104 has completed a host generated command. For example, the host generated command may be a write request to write data to a location of the NVM 110 or a read request to read data from a location of the NVM 110. After completing the command, the controller 108 includes adaptive and dynamic interrupt coalescing logic 304. The adaptive and dynamic interrupt coalescing logic 304 includes a static algorithm that determines whether a time threshold or a predetermined period of time has passed or a number of completion entries have been posted to the completion queue 154 before posting an interrupt to the host device at block 306.

The controller 108 further includes interrupt coalescing protection logic 308. The interrupt coalescing protection logic 308 works asynchronous to the adaptive and dynamic interrupt coalescing logic 304. The interrupt coalescing protection logic 308 monitors the head pointer and the tail pointer of the completion queue 154. When the interrupt coalescing protection logic 308 detects that the head pointer or the tail pointer of the completion queue 154 are not equal and has not changed for a predetermined period of time while a timer is active, an interrupt is sent to the host device 104. The interrupt is sent in order to avoid missing interrupts, deadlocks, and/or host device 104 timeout scenarios.

For example, the timer or a counter may be used to determine the time that the head pointer or the tail pointer has not changed. In some embodiments, separate interrupt coalescing protection logic is implemented for each completion queue of the plurality of completion queues, such that each completion queue has a timer. When the interrupt coalescing protection logic 308 posts an interrupt to the host device 104 at block 306, the interrupt coalescing protection logic 308 bypasses the adaptive and dynamic interrupt coalescing logic 304.

Figure 4:
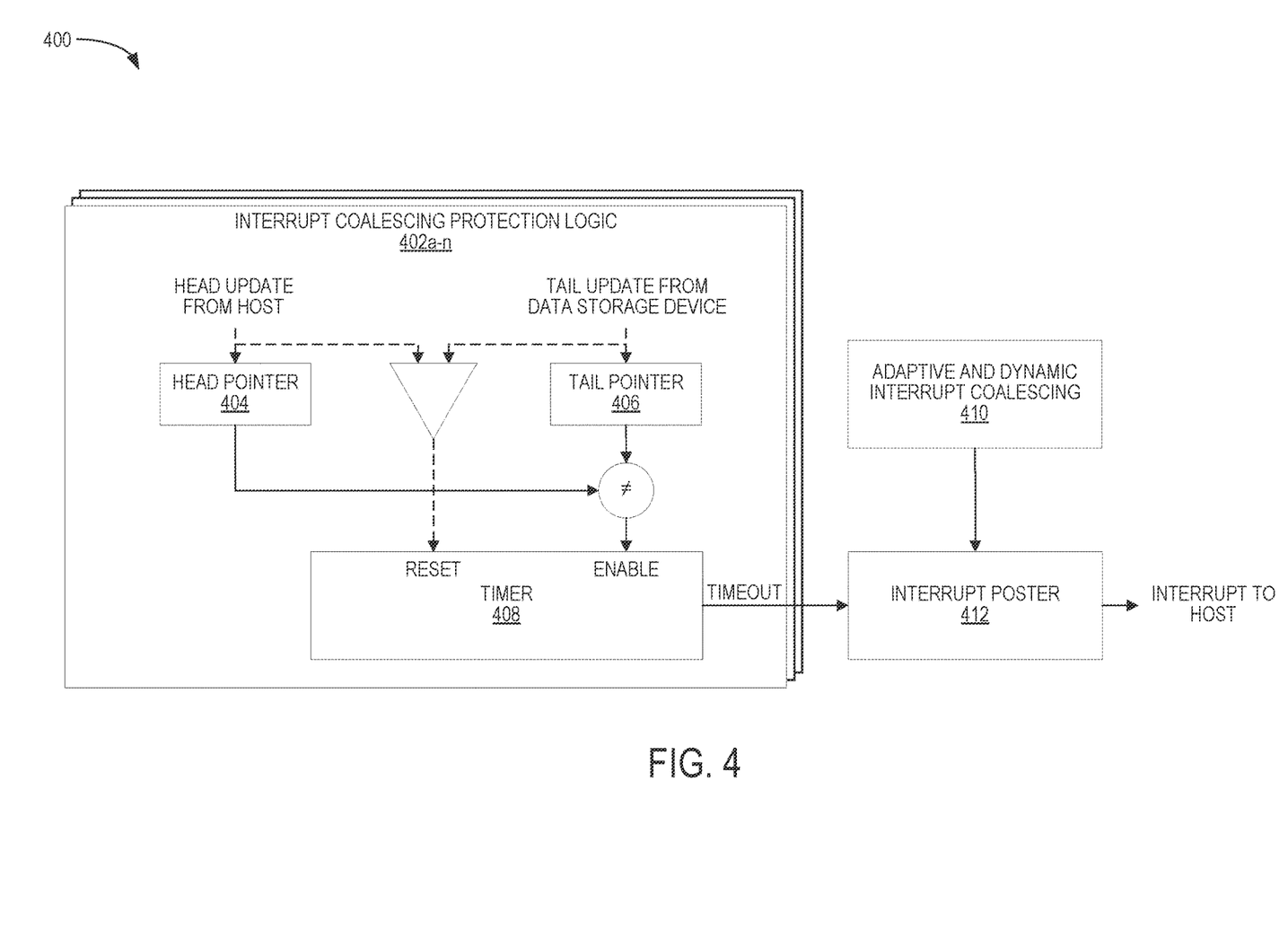
FIG. 4 is a schematic block diagram of interrupt coalescing protection logic, according to certain embodiments.

FIG. 4 is a schematic block diagram of interrupt coalescing protection logic, according to certain embodiments. Aspects of FIG. 1 may be utilized to aid in the description of FIG. 4. The usage of FIG. 1 is not intended to be limiting, but to provide an example of a possible embodiment. The data storage device 106 includes the controller 108. For each completion queue 154 of the host device 104, the controller 108 may include one or more interrupt coalescing protection logic 402a-n. In one embodiment, each completion queue includes separate interrupt coalescing protection logic. In another embodiment, multiple completion queues may share interrupt coalescing protection logic such that a single interrupt coalescing protection logic can service multiple completion queues. Each of the one or more interrupt coalescing protection logic 402a-n includes a timer 408. In the description below, the completion queue 154 is associated with a first interrupt coalescing protection logic 402a, for exemplary purposes.

When the head pointer 404 and the tail pointer 406 of the completion queue 154 are not equal, the timer 408 is enabled, such that the timer is active. Furthermore, when either the head pointer 404 of the completion queue 154 is updated from the host device 104 or the tail pointer 406 of the completion queue 154 is updated from the data storage device 106, the first interrupt coalescing protection logic 402 detects the change in either the head pointer 404 or the tail pointer 406. The detection of the change in either the head pointer 404 or the tail pointer 406 causes the timer 408 to reset.

When the timer 408 is enabled or active and the interrupt coalescing protection logic 402a does not detect any head pointer 404 or tail pointer 406 updates, the interrupt coalescing protection logic 402a may post a timeout after a predetermined period of time. The predetermined period of time may be a dynamic period of time. The dynamic period of time may be based upon one or more host device 104 characteristics, a completion queue depth, and an application type requested in a command from the host device 104. The listed dependencies of the dynamic period of time are not intended to be limiting as other dependencies may be relevant and applicable to the described embodiments.

When the timeout is posted, the interrupt poster 412 posts an interrupt to the host device 104. Similarly, the adaptive and dynamic interrupt coalescing logic 410 may also send an indication to the interrupt poster 412 to post an interrupt to the host device 104. Though both the one or more interrupt coalescing protection logic 402a-n and the adaptive and dynamic interrupt coalescing logic 410 may instruct the interrupt poster 412 to post an interrupt to the host device 104, the one or more interrupt coalescing protection logic 402a-n and the adaptive and dynamic interrupt coalescing logic 410 works independently and asynchronously with each other.

Figure 5:
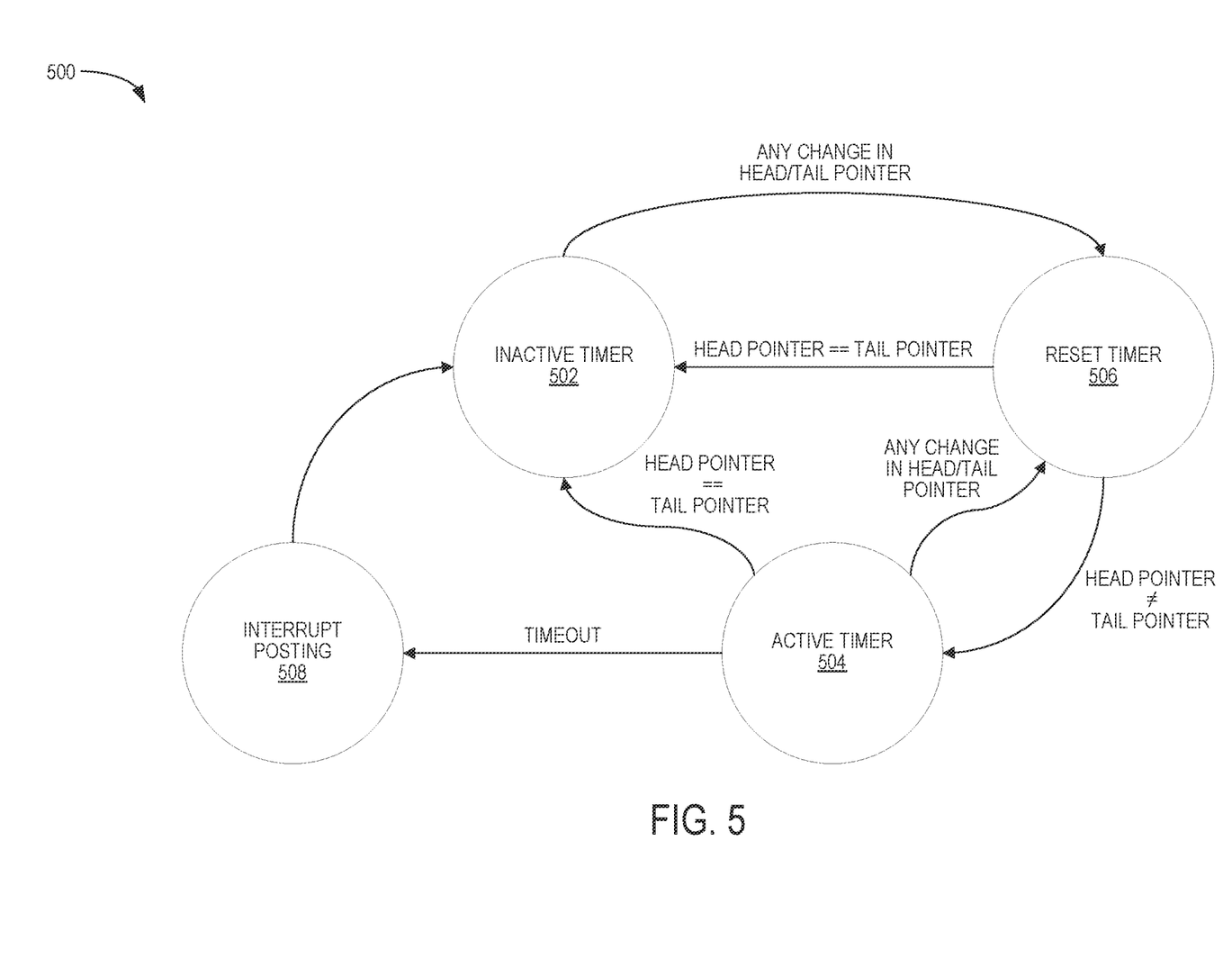
FIG. 5 is a schematic block diagram of an interrupt coalescing protection state machine, according to certain embodiments.

FIG. 5 is a schematic block diagram of an interrupt coalescing protection state machine 500, according to certain embodiments. The interrupt coalescing protection state machine 500 may be referred to as the state machine 500, for exemplary purposes. The state machine 500 may describe any of the interrupt coalescing protection logic 402a-n of FIG. 4 or any other applicable interrupt protection logic contemplated. The state machine 500 includes an inactive timer state 502, an active timer state 504, a reset timer state 506, and an interrupt posting state 508.

The inactive timer state 502 describes when the timer, such as the timer 408 of FIG. 4, is inactive. When the completion queue, such as the completion queue 154 of FIG. 1, is empty (i.e., does not have any completion entries), the timer is in the inactive timer state 502. Because the completion queue 154 is empty, the head pointer, such as the head pointer 404 of FIG. 4, and the tail pointer, such as the tail pointer 406 of FIG. 4, are equal to each other. When the head pointer 404 and the tail pointer 406 are equal to each other, the head pointer 404 and the tail pointer 406 are pointing to the same location. Furthermore, in other scenarios where the head pointer 404 and the tail pointer 406 are equal to each other, the state machine 500 is in the inactive timer state 502. When the timer 408 is inactive, the timer 408 is no longer incrementing or counting.

The active timer state 504 describes when the timer 408 is counting or incrementing due to one or more completion entries present in the completion queue 154. When the one or more completion entries are present in the completion queue 154, the head pointer 404 and the tail pointer 406 are not equal to each other. Thus, the timer 408 is counting the time that the one or more completion entries are stored in the command queue 154. When the timer 408 reaches a predetermined period of time or a threshold time, a timeout occurs and the state machine 500 moves to the interrupt posting state 508.

The reset timer state 506 describes when a new completion entry is received in the completion queue 154 or when a completion entry of the completion queue is read by the host device 104 due to receiving an interrupt associated with the relevant completion entry. When a change is detected by the interrupt coalescing protection logic, such as the first interrupt coalescing protection logic 402a of FIG. 4, the state machine 500 moves from the inactive timer state 502 or the active timer state 504 to the reset timer state 506. The change may be an update to the head pointer 404 or the tail pointer 406. For example, when a new completion entry is sent to the completion queue 154, the tail pointer 406 updates to a new end position.

Furthermore, when the head pointer 404 is updated, such as when the host device 104 receives an interrupt for a completion entry (may be one or more completion entries, where the one or more completion entries is less than the total amount of completion entries), the timer 408 is reset and the state machine 500 moves to the reset timer state 506.

For example, the interrupt may be received due to the adaptive and dynamic interrupt coalescing logic 410 of FIG. 4. After the timer 408 is reset, the interrupt coalescing protection logic 402a determines whether the head pointer 404 is equal to the tail pointer 406. If the head pointer 404 is equal to the tail pointer 406, then the state machine 500 moves to the inactive timer state 502. However, if the head pointer 404 is not equal to the tail pointer 406, then the state machine 500 moves to the active timer state 504.

The interrupt posting state 508 describes when the timer 408 in the active timer state 504 has a timeout. The timeout may occur when the predetermined period of time has elapsed or has been reached by the timer 408 for one or more completion entries in the completion queue 154. At the interrupt posting state 508, an interrupt is posted for the one or more completion entries in the completion queue 154 to the host device 104, and the state machine 500 moves to the inactive timer state 502 because the completion queue 154 is empty.

Figure 6:
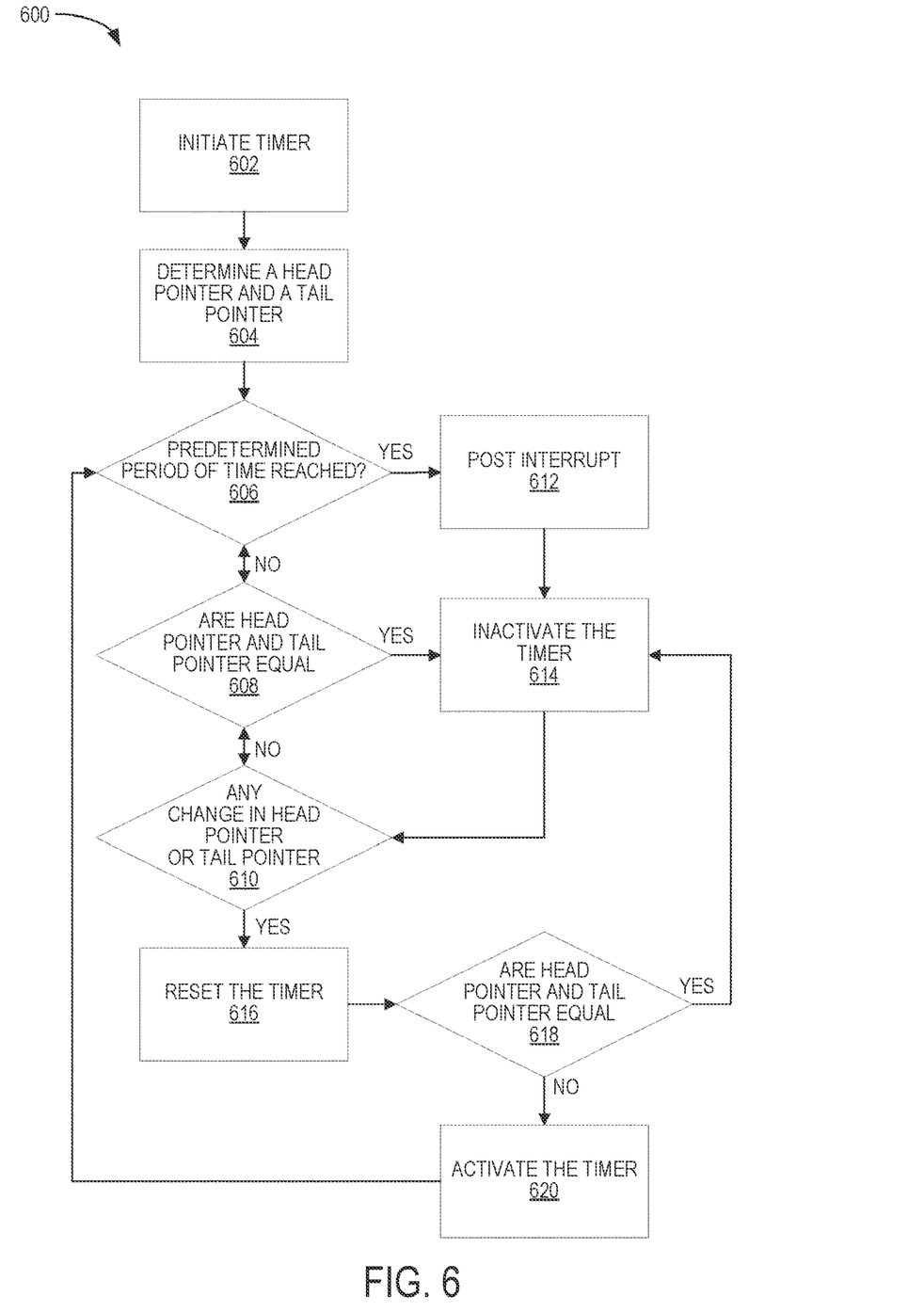
FIG. 6 is a block diagram illustrating a method of interrupt coalescing protection logic, according to certain embodiments.

FIG. 6 is a block diagram illustrating a method 600 of interrupt coalescing protection logic, according to certain embodiments. Aspects of the method 600 may be similar to those described in the state machine 500 of FIG. 5. Aspects of FIG. 4 and FIG. 5 may be referred to with the method 600. The aspects utilized are not intended to be limiting, but to provide an example of a possible embodiment.

At block 602, the timer 408 of the interrupt coalescing protection logic 402a is initiated. The timer 408 may be initiated because of a completion entry sent to the completion queue, such as the completion queue 154 of FIG. 1. Upon determining that the head pointer 404 and the tail pointer 406 are not equal at block 604, the active timer state 504 of the state machine 500 is set.

The interrupt coalescing protection logic 402a may move between blocks 606, 608, and 610 of the method 600 until a criteria (indicated by "YES") is met.

After determining that the head pointer 404 and the tail pointer 406 are not equal to each other and setting the state of the state machine 500 to the active timer state 504, at block 606, the interrupt coalescing protection logic 402a determines if the predetermined period of time has been reached. The predetermined period of time may be a dynamic period of time. The dynamic period of time may be based upon one or more characteristics of the host device, such as the settings of the host device 104, a completion queue depth, and an application type requested in a command from the host device 104. The listed dependencies of the dynamic period of time are not intended to be limiting as other dependencies may be relevant and applicable to the described embodiments. If the predetermined period of time has been reached at block 606, then the state machine 500 moves to the interrupt posting state 508. At block 612, the interrupt is posted to the host device 104 and the timer 408 is inactivated at the inactive timer state 502 at block 614. After inactivating the timer at block 614, the interrupt coalescing protection logic 402a determines if there is any change in the head pointer 404 or the tail pointer 406 at block 610.

However, if the predetermined period of time has not been reached at block 606, then the interrupt coalescing protection logic 402a determines if the head pointer 404 and the tail pointer 406 are equal at block 608. If the head pointer and the tail pointer are equal at block 608, then the timer 408 is inactivated at block 614 and the state machine 500 moves to the inactive timer state 502. After inactivating the timer at block 614, the interrupt coalescing protection logic 402a determines if there is any change in the head pointer 404 or the tail pointer 406 at block 610.

At block 610, the interrupt coalescing protection logic 402a determines if there is any change in the head pointer 404 or the tail pointer 406. If there is a change in either the head pointer 404 or the tail pointer 406 at block 610, then the timer 408 is reset and the state machine 500 moves to the reset timer state 506. At block 618, the interrupt coalescing protection logic 402a determines if the head pointer 404 and the tail pointer 406 are equal at block 618. If the head pointer 404 and the tail pointer 406 are equal at block 618, then the timer 408 is inactivated at block 614 and the state machine 500 moves to the inactive timer state 502. However, if the head pointer 404 and the tail pointer 406 are not equal at block 618, the timer 408 is activated at block 620 and the state machine 500 moves to the active timer state 504. After activating the timer 408 at block 620, the interrupt coalescing protection logic 402a determines if the predetermined period time has been reached at block 606.

By including interrupt coalescing protection logic, more complex interrupt coalescing algorithms may be implemented without having the risk of interrupt avoidance occurring in the operations of the data storage device.

In one embodiment, a data storage device includes one or more non-volatile memory devices and a controller coupled to the memory devices. The controller includes interrupt coalescing protection logic configured to detect that a head pointer or a tail pointer in a completion queue has not changed for a predetermined period of time and post an interrupt to a host device.

The predetermined period of time is a dynamic period of time. The dynamic period of time is based on one or more host device characteristics. The dynamic period of time is based on a completion queue depth. The dynamic period of time is based on an application type requested in a command from the host device. The predetermined period of time is a fixed period of time. The interrupt coalescing protection logic is further configured to detect a change in either the head pointer or the tail pointer and reset a timer tracking the predetermined period of time. The interrupt coalescing protection logic is further configured to determine that the head pointer is equal to the tail pointer and inactivate a timer tracking the predetermined period of time. The interrupt coalescing protection logic is further configured to perform adaptive and dynamic interrupt coalescing. The adaptive and dynamic interrupt coalescing is independent of the interrupt coalescing protection logic. The completion queue is disposed on a host device, the host device comprises a plurality of completion queues, and each completion queue comprises separate interrupt coalescing protection logic disposed in the controller.

In another embodiment, a data storage device includes one or more non-volatile memory devices and a controller coupled to the memory devices. The controller includes interrupt coalescing protection logic configured to move between a state where a timer is active, the timer is reset, and the timer is inactive, and post an interrupt to a host device after the timer is active and a timeout has occurred.

The interrupt coalescing protection logic is further configured to move the timer to an inactive state after posting the interrupt. The interrupt coalescing protection logic is further configured to move the timer to a reset state upon determining a change in a head pointer or a tail pointer of a completion queue. The interrupt coalescing protection logic is further configured to move the timer to an activate state upon determining that the head pointer is not equal to the tail pointer. The interrupt coalescing protection logic is further configured to move the timer to an inactive state upon determining that the head pointer is equal to the tail pointer when the timer is reset. The interrupt coalescing protection logic is further configured to move the timer to the reset state upon detecting a change in either the head pointer or the tail pointer. The interrupt coalescing protection logic is further configured to move the timer to the inactive state upon determining that the head pointer is equal to the tail pointer when the timer is active.

In another embodiment, a data storage device includes one or more non-volatile memory devices, means to perform adaptive and dynamic interrupt coalescing, and means to post an interrupt to a host device based upon a timer.

A number of means to post the interrupt to the host device based on the timer is equal to a number of completions queues in the host device.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
one or more non-volatile memory devices; and
a controller coupled to the one or more non-volatile memory devices, wherein the controller comprises interrupt coalescing protection logic configured to:
determine that either a head pointer, a tail pointer, or both the head pointer and the tail pointer of a completion queue have changed;
reset a timer based on the determining;
detect that the head pointer or the tail pointer in the completion queue has not changed for a predetermined period of time, wherein the timer measures a period of time that the head pointer and the tail pointer have not changed; and
post an interrupt to a host device.

2. The data storage device of claim 1, wherein the predetermined period of time is a dynamic period of time.

3. The data storage device of claim 2, wherein the dynamic period of time is based on one or more host device characteristics.

4. The data storage device of claim 2, wherein the dynamic period of time is based on a completion queue depth.

5. The data storage device of claim 2, wherein the dynamic period of time is based on an application type requested in a command from the host device.

6. The data storage device of claim 1, wherein the predetermined period of time is a fixed period of time.

7. The data storage device of claim 1, wherein the interrupt coalescing protection logic is further configured to:
detect a change in either the head pointer or the tail pointer; and
reset a timer tracking the predetermined period of time.

8. The data storage device of claim 1, wherein the interrupt coalescing protection logic is further configured to:
determine that the head pointer is equal to the tail pointer; and
inactivate a timer tracking the predetermined period of time.

9. The data storage device of claim 1, wherein the interrupt coalescing protection logic is further configured to perform adaptive and dynamic interrupt coalescing.

10. The data storage device of claim 9, wherein the adaptive and dynamic interrupt coalescing is independent of the interrupt coalescing protection logic.

11. The data storage device of claim 1, wherein the completion queue is disposed on a host device, wherein the host device comprises a plurality of completion queues, and wherein each completion queue comprises separate interrupt coalescing protection logic disposed in the controller.

12. A data storage device, comprising:
one or more non-volatile memory devices; and
a controller coupled to the one or more non-volatile memory devices, wherein the controller comprises interrupt coalescing protection logic configured to:
determine whether a head pointer, a tail pointer, or both the head pointer and the tail pointer of a completion queue have changed;
move between a state where a timer is active, the timer is reset, and the timer is inactive, wherein the state of the timer is based on the determining, and
wherein the timer measures a period of time that the head pointer and the tail pointer have not changed; and
post an interrupt to a host device after the timer is active and a timeout has occurred.

13. The data storage device of claim 12, wherein the interrupt coalescing protection logic is further configured to move the timer to an inactive state after posting the interrupt.

14. The data storage device of claim 12, wherein the interrupt coalescing protection logic is further configured to move the timer to a reset state upon determining a change in the head pointer or the tail pointer of a completion queue.

15. The data storage device of claim 14, wherein the interrupt coalescing protection logic is further configured to move the timer to an active state upon determining that the head pointer is not equal to the tail pointer.

16. The data storage device of claim 15, wherein the interrupt coalescing protection logic is further configured to move the timer to an inactive state upon determining that the head pointer is equal to the tail pointer when the timer is reset.

17. The data storage device of claim 16, wherein the interrupt coalescing protection logic is further configured to move the timer to the reset state upon detecting a change in either the head pointer or the tail pointer.

18. The data storage device of claim 14, wherein the interrupt coalescing protection logic is further configured to move the timer to an inactive state upon determining that the head pointer is equal to the tail pointer when the timer is active.

19. A data storage device, comprising:
one or more non-volatile memory means; and
a controller coupled to the one or more non-volatile memory means, wherein the controller is configured to:
perform adaptive and dynamic interrupt coalescing; and
post an interrupt to a host device based on a timer, wherein the timer is reset when either a head pointer, a tail pointer, or both the head pointer and the tail pointer of a completion queue have changed, and wherein the timer measures a period of time that the head pointer and the tail pointer have not changed.

20. The data storage device of claim 19, wherein a number of times that the controller is configured to post the interrupt to the host device based on the timer is equal to a number of completion queues in the host device.

* * * * *